May 14, 1968  D. W. DUFFEY  3,383,088
PLUG VALVES
Filed Feb. 3, 1966
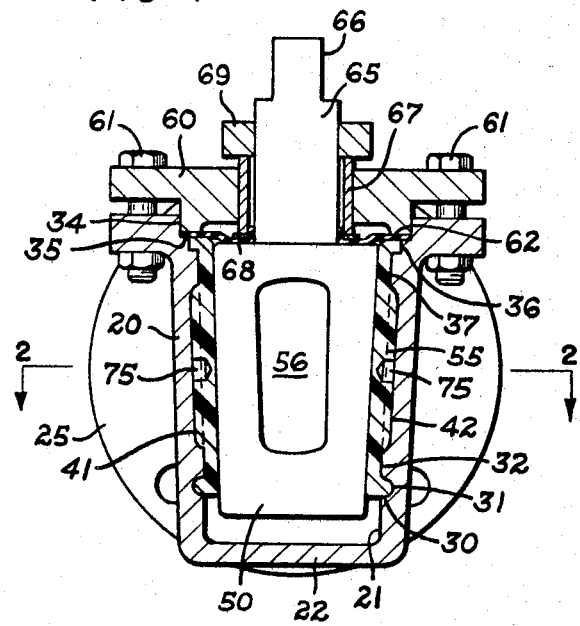
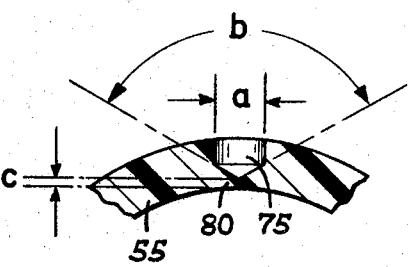
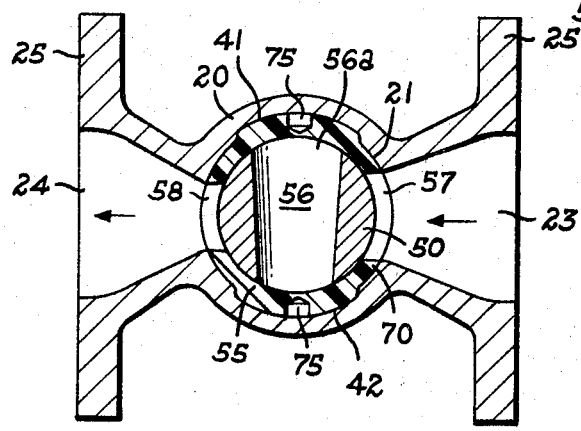
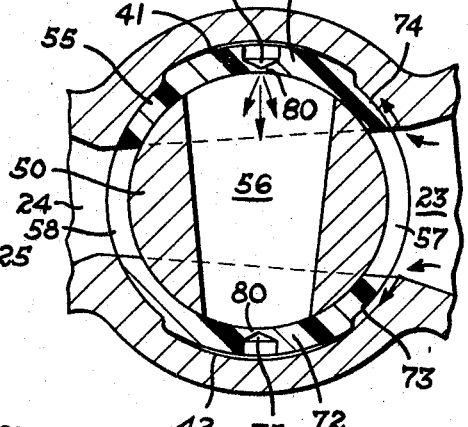
INVENTOR.
DONN W. DUFFEY
BY
*Mareckel, Biebel, French & Bugg*
ATTORNEYS

United States Patent Office 3,383,088
Patented May 14, 1968

3,383,088
PLUG VALVES
Donn W. Duffey, Dayton, Ohio, assignor to The Duriron Company, Inc., Dayton, Ohio, a corporation of New York
Filed Feb. 3, 1966, Ser. No. 524,697
10 Claims. (Cl. 251—317)

The present invention relates to an improved plug valve, and more particularly to a plug valve including a fluorocarbon sleeve having a pressure relief area capable of bursting in the event of a build-up of the pressure above a predetermined minimum to relieve the pressure between the sleeve and the body.

Plug valves of the type to which the present invention relates include a body provided with a bore, and a plug which is received in a fluorocarbon sleeve also positioned in the bore. The sleeve provides a seal and a surface which possesses a relatively low coefficient of friction. The valves of this general type are used with corrosive liquids, and thus the sleeve is preferably made of polytetrafluoroethylene. Typical valve structures include those described in U.S. Patents 2,713,987, 2,728,550, 2,729,420, 2,735,645, 2,961,214, 2,913,219, 2,987,295, 3,146,286 and 3,199,835, all assigned to the assignee of this application.

Polytetrafluoroethylene is a resin which is more easily deformable at elevated temperatures, and also shows a tendency to permit permeation therethrough of low molecular weight gases and the like. Under certain types of valve service, there is a tendency for the valve sleeve to bulge inwardly into the openings of the port when the plug is in the closed position. This condition is due either to passage of fluid between the sleeve and the body on the upstream side, because the line pressure causes the plug to be forced tightly in a downstream direction against the sleeve, or because of permeation of low molecular weight materials through, the sleeve itself, or a combination of both. The effect is to provide a build-up of pressure between the sleeve and the body particularly if there is a rapid heating of the valve up to about 350° F. by an outside source which causes inward deflection of the sleeve into the plug ports. As the plug is turned to the open position, either the sleeve is turned with the plug, or the bulging portions of the sleeve are sheared and torn, thus destroying the sealing efficiency of the sleeve.

It has been proposed in the prior art to utilize vent holes in the sleeve located 90° with respect to the body ports thereby providing free and unobstructed flow of fluid between the back side of the sleeve and the plug port with the plug in the closed position. Such an arrangement is shown, for example, in U.S. Patent 3,066,-909. While the use of vent holes operates satisfactorily to prevent a pressure build-up on the back side of the sleeve, they also permit passage of fluid from the plug port to the back side of the sleeve when the plug is in the closed position. The disadvantage of this arrangement is that some types of valve service require that the material flowing through the valve remain free of contaminants. For example, the valve may be handling one type of fluid at one time, which may act as a contaminant for other fluids which thereafter flow through the valve. With some materials, for example, reactive monomers which solidify on standing, unobstructed flow to the back side of the sleeve allows these materials to collect and solidify, resulting in sleeve failure on operation of the valve. Additionally, this particular problem appears to be limited in occurrence to services which include low molecular weight monomeric materials and/or low molecular weight gases.

In accordance with the present invention, the sleeve is protected by a pressure relief area which is so positioned in the sleeve as to be in alignment with the plug ports with the plug in the closed position. The pressure relief area is preferably a portion of the sleeve having a thickness dimension less than the thickness of the sleeve surrounding the relief area. In the event of a pressure build-up sufficiently high to cause bulging of the sleeve into the plug port, with possible tearing or turning of the sleeve when the plug is turned to the closed position, the sleeve bursts into the plug port to provide a relatively small weep hole permitting equalization of pressure between the back side of the sleeve and the plug port. One feature of the present invention is that the bursting of the sleeve provides a relatively small weep hole in the sleeve which is much smaller in area than the area of reduced section which forms the pressure relief area.

In normal service, the sleeve provides a continuous seal element free of any passageways which permit flow of fluid from the plug port to the back side of the sleeve. The pressure relief area operates only as a safety feature to protect the sleeve in those instances wherein pressure conditions exist tending to cause turning or tearing of the sleeve as previously noted. Additionally, even if the pressure relief area bursts because of the existence of pressure pockets, the flow from the plug port to the back side of the sleeve is at a substantially smaller rate than if there were a vent hole in the sleeve permitting unobstructed flow therethrough in either direction. Even in the event of bursting in the pressure relief area, it has been observed in accordance with the present invention that flow from the plug port to the back side of the sleeve does not occur in any appreciable amounts until the pressure in the plug port is noticeably higher than the pressure on the back side of the sleeve. Thus, although there is a weep hole present in the sleeve, no appreciable flow from the plug port to the back side of the sleeve will take place if the pressure in the plug port remains only a relatively small amount greater than the pressure on the back side of the sleeve.

Accordingly, it is a primary object of the present invention to provide a plug valve utilizing a sleeve as a sealing element wherein the sleeve is provided with pressure relief areas capable of relieving the pressure between the sleeve and the body into the plug port with the valve in the closed position.

Another object of the present invention is to provide a plug valve utilizing a fluorocarbon sleeve wherein the sleeve is provided with pressure relief areas which are aligned with the plug port in the closed position of the plug, and which are capable of bursting above a predetermined pressure to permit equalization of the pressure from the back side of the sleeve into the plug port while permitting only obstructed flow in the reverse direction.

A further object of the present invention is the provision of a plug valve utilizing a polytetrafluoroethylene seal element which includes spaced pressure relief areas arranged 90° to the body ports and alignable with the plug port in the closed position of the valve, wherein the relief areas are designed to burst above a predetermined minimum pressure to protect the sleeve, the relief areas on bursting providing flow from the back side of the sleeve into the plug port which is at a substantially greater rate than that from the plug port to the back side of the sleeve.

Other objects and advantages of the present invention will be apparent from the following description, the accompanying drawing and the appended claims.

In the drawing:

FIG. 1 is a view partly in section and partly in elevation of a plug valve in accordance with the present invention;

FIG. 2 is a sectional view along the lines 2—2 of FIG. 1 with the plug in the closed position;

FIG. 3 is an enlarged fragmentary section of FIG. 2; and

FIG. 4 is an enlarged fragmentary section showing the details of the pressure relief area in the sleeve in accordance with the present invention.

Referring to the drawing, which illustrates a preferred embodiment of the invention, the valve in FIGS. 1 and 2 includes a body 20 having a conical bore 21 extending transversely therethrough from the top of the body and having its bottom end closed by an integral portion 22 of the body. Ports 23 and 24 open into the bore 21 from opposite sides of the valve body, and flanges 25 are provided at the outer ends of the port for attachment to pipes in the usual way.

As shown in FIG. 1, an annular shoulder 30 is provided at the lower end of the tapered portion of the bore 21, the inner diameter of the shoulder being appreciably less than the minimum diameter of the tapered portion of the bore. Above this shoulder 30 the surface of the bore is provided with a preferably continuous annular groove 31 of substantially greater diameter than the portion of the bore immediately thereabove, and thus the bore includes a continuous annular land 32 extending around the lower end of the tapered surface of the bore.

At the top of the valve body 20 there is a counterbore 34 terminating in an annular shoulder 35 and spaced below this shoulder is a second circumferential groove 36 similar to groove 31. Immediately below this groove 36 is a circumferential land 37 on the bore surface similar to the land 32 adjacent the lower end of the bore and similarly extending continuously around that surface of the bore.

The surface area of the bore between the land portions 32 and 37 is provided with a plurality of pockets 41 and 42 which may be of the same depth as the grooves 31 and 36 as compared with the adjacent surface portions of the bore. A tapered valve plug 50 is received within the bore 21 and is of sufficiently smaller radial dimensions than the bore to establish an annular clearance therebetween. Received in the annular clearance is a sleeve 55 of fluorocarbon resin, preferably polytetrafluoroethylene, for providing the desired sealing action between the plug and the body. The plug is provided with a through port 56 adapted for alignment with the body ports 23 and 24 and liner ports 57 and 58.

The upper end of the valve body 20 is closed by a cap 60 secured to the body by screws 61 and the inner portion of the cap clamps an annular polytetrafluoroethylene diaphragm 62 on the shoulder 35 to provide a seal. The plug includes a stem 65 which projects through the cap 60 and is provided with flats 66 on each side thereof for engagement with an operating handle in the usual way. Sealing pressure of the plug with the sleeve 55 is maintained by means of a thrust collar 67 which is in contact with a washer 68 which in turn engages the upper surface of the plug through the diaphragm 62, the thrust collar 67 being forced against the plug by an adjustor 69 secured to the cap 60 by screws (not shown). The diaphragm also acts as a plug stem seal.

The inlet port 23 of the body, and the inlet side of the plug 56a are preferably so constructed and arranged that during rotational movement of the plug from the open position to the closed position, the outlet port 24 closes entirely while the interior of the plug port continues in direct fluid receiving relationship with the inlet port of the body and substantially the same pressure as inlet pressure. In this way, the portion of the sleeve generally designated 70 is prevented from being deflected inwardly and torn as the plug is turned. For further details of alternate forms of valve which may be used, reference is made to U.S. Patent 2,987,295 previously identified.

It has been observed in certain types of valve service that rotation from the closed position to the open position may damage the sleeve 55 because of a pressure build-up between the portions of the sleeve 71 and 72, shown in FIG. 3 and the facing surface of the body. The precise cause of the pressure build-up is not completely understood and may be attributable to one or a combination of causes as follows. In the closed position of the valve a substantial portion of the plug surface faces the inlet port 23 and is exposed to line pressure thus causing a slight lateral shift of the plug towards the downstream side. This reduces the sealing efficiency of the portions of the sleeve generally indicated at 73 and 74 thus allowing fluid under pressure to seep between the sleeve and the body as shown by the arrows in FIG. 3. Also, as mentioned previously, polytetrafluoroethylene exhibits a tendency to permit permeation therethrough of low molecular weight materials. Additionally, at elevated temperatures, polytetrafluoroethylene tends to soften, and this condition may be aggravated by absorption by the sleeve of various chemicals. Thus, the softening of the sleeve and the pressure build-up causes portions of the sleeve 71 and 72 to bulge inwardly into the plug port 56 with the valve in the closed position. As the plug is rotated to the open position, the sleeve may be torn, or in the alternate may become so firmly locked in the plug as to turn with the plug rather than remain stationary with respect to the body.

In accordance with the present invention, the problem described above is substantially eliminated by the use of a pressure relief area 75 positioned on the outer surface of the sleeve and facing the body, as shown in FIG. 3. There are preferably two such relief areas, spaced axially and circumferentially on the sleeve so as to be in alignment with the plug port in the closed position of the valve. In the event of a pressure build-up above a predetermined minimum, that is, a pressure behind the sleeve which forces it into the plug port, the pressure relief area will burst releasing the pressure behind the sleeve into the plug port thereby preventing turning or tearing of the sleeve. Until after bursting at the pressure relief area, the sleeve is free of holes or apertures other than the ports 57 and 58 and thus, a continuous seal area is provided which substantially eliminates the accumulation of fluid materials between the valve body and the opposed surface of the sleeve.

The pressure relief area acts as a safety feature in those exceptional instances in which temperature, pressure or types of service, or combinations thereof give rise to accumulation of pressure behind portions 71 and 72 of the sleeve. It is to be understood that in normal use of the valve, the continuous nature of the seal provided by the sleeve substantialy eliminates the accumulation of fluids between the sleeve and the body.

Referring to FIG. 4, the pressure relief area is preferably a circular cavity having a diameter $a$ of between ¼ to ⅜ of an inch. The relief area may be conveniently placed in the sleeve by drilling with a drill having an included angle $b$ at the point thereof between 110° and 130°. The depth of drilling is sufficient to provide a relatively thin membrane-like section 80 having a dimension at $c$ of between 0.010 and 0.022 of an inch.

In tests conducted with a ¼ inch diameter pressure relief area using a drill having a 120° angle on a two inch valve, the following data was collected:

TABLE I

[Pressure Relief Tests ¼" Hole With 120° Drill Angle 2" "G" Valves]

| Membrane Thickness, (inch) | Temp. of Sleeve, °F. | Rupture Pressure | Torque Required Before/After Rupture (foot pounds) |
|---|---|---|---|
| .015 | 75 | Partial at 250 p.s.i. | 35/50 |
|  |  | Full at 550 p.s.i. | 50/30 |
| .017 | 75 | Partial at 350 p.s.i. | 48/48 |
|  |  | Full at 450 p.s.i. | 48/38 |
| .020 | 75 | Partial at 400 p.s.i. | 62/58 |
|  |  | Full at 450 p.s.i. | 58/40 |
| .022 | 75 | Partial at 400 p.s.i. | 73/65 |
|  |  | Full at 500 p.s.i. | 65/40 |
| .025 | 75 | Partial at 400 p.s.i. | 65/65 |
|  |  | Full at 500 p.s.i. | 65/40 |
| .030 | 75 | Full at 450 p.s.i. | 90/55 |

Tests have also indicated that depending upon the dimension of the membrane-like section of the relief area, the membrane will burst at approximately 200 to 225 p.s.i. pressure differential for a thickness dimension of approximately 0.010 of an inch and may be as high as 345 to 400 p.s.i. for a membrane dimension of 0.022 of an inch.

It is preferred in accordance with the present invention that the diameter of the relief area be between ¼ to ⅜ of an inch with an included angle of between 105° to 120° to provide a membrane-like section 80 which is between 0.010 and 0.015 of an inch thick, thus rupturing at a pressure less than that which will cause damage to the sleeve either by tearing or turning.

It has been observed that upon bursting, the membrane 80 does not permit unobstructed flow in both directions, that is, the rate of flow into the plug port is substantially greater than the rate of flow from the plug port to the back side of the sleeve. For example, using a membrane having a thickness of 0.012 of an inch with a pressure of 60 p.s.i., the flow through the ruptured membrane to the plug port was approximately 1950 cubic centimeters per minute while flow from the port through the same ruptured membrane to the back side of the sleeve was approximately 214 cubic centimeters per minute. In the case of a membrane having a thickness of 0.015 of an inch at 60 pounds per square inch of pressure, the flow rate into the plug port was 120 cubic centimeters per minute while flow from the plug port to the back side of the sleeve was very slight and immeasurable. Thus, upon bursting, the relief area operates as a check valve, relieving pressure on the back side of the sleeve but tending to prevent reverse flow of fluid from the plug port to the back side of the sleeve. Of course, it is understood that as the pressure in the plug port far exceeds the pressure on the back side of the sleeve, there will be some flow, but at a far lower rate than if the back side of the liner were at the same greater pressure as the plug port.

This feature is of significance since it tends to prevent unobstructed flow of fluid from the plug port to the back side of the sleeve while at the same time permitting flow in the reverse direction to relieve pressure, if needed, in order to protect the sleeve.

While the present invention has been described with reference to a valve utilizing pockets, it is clear that the existence of pockets or spaces between the back side of the sleeve and the body is not a structural configuration which gives rise to this type problem. For example, a similar problem may exist with valves of the type shown in U.S. Patents 2,713,987, 2,729,420 and 2,735,645.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:
1. A plug valve including a body having a bore, ports opening into said bore, a fluorocarbon resin sleeve received in said bore, said sleeve having openings therein communicating with said ports, a valve plug received in sealing relation is said sleeve, a port in said plug communicating with said body ports in the open position of the valve and sealed by said sleeve in the closed position of said valve, said sleeve being deformable into said plug port in the closed position of the valve by accumulation of pressure between the body and the opposed facing portion of the sleeve, said sleeve including means defining a pressure relief area which bursts at a pressure above a predetermined minimum to relieve said accumulated pressure into the plug port, portions of said sleeve other than the relief area being capable of withstanding pressure above said predetermined minimum, and said pressure relief area being so located in said sleeve that in the event of pressure conditions above said predetermined minimum the pressure between the body and the portion of the sleeve facing the plug port is reduced below said predetermined minimum thereby preventing turning or tearing of the sleeve as the plug is rotated to the open position.

2. A plug valve as set forth in claim 1 wherein said valve body includes pocket means positioned in said bore between said body ports, said sleeve including portions thereof received in said pocket means, and said pressure relief area being located in the portion of the sleeve received in said pocket means.

3. A plug valve as set forth in claim 2 including means in said body bore to prevent axial and rotary movement of said sleeve relative to said bore.

4. A plug valve as set forth in claim 1 wherein said body and plug and sleeve are so constructed that during rotation of the plug from the open to the closed position, the downstream side of said valve closes entirely while the interior of the plug port remains in direct fluid receiving relation.

5. A plug valve as set forth in claim 1 wherein said sleeve is polytetrafluoroethylene.

6. A plug valve as set forth in claim 1 wherein said pressure relief area of said sleeve comprises a portion of said sleeve having a thickness dimension less than the thickness of the sleeve surrounding said relief area, and said area of lesser thickness operating in response to pressure above said minimum causing bursting across only a small segment of said pressure relief area.

7. A plug valve as set forth in claim 1 wherein said sleeve is a generally tubular element free of holes except for the ports therethrough.

8. A plug valve as set forth in claim 1 wherein bursting of said pressure relief area in response to pressure above said minimum provides for flow of fluid from behind said sleeve to said plug port at a rate greater than the rate of flow from said plug port to the area between said sleeve and body.

9. A plug valve as set forth in claim 6 wherein said sleeve is polytetrafluoroethylene and wherein said pressure relief area is a membrane having a thickness dimension of between 0.010 and 0.022 of an inch.

10. A valve plug as set forth in claim 1 including pockets in said body which receive portions of said sleeve, and wherein there is a pressure relief area in the portion of the sleeve received in each of said pockets, and said pressure relief areas upon bursting permitting a flow from said pocket to said plug port which is greater than the flow from said plug port to said pocket.

References Cited

UNITED STATES PATENTS

| | | | |
|---|---|---|---|
| 2,994,504 | 8/1961 | Reed | 251—317 X |
| 3,066,909 | 12/1962 | Reed | 251—317 X |

M. CARY NELSON, *Primary Examiner.*

J. R. DWELLE, *Assistant Examiner.*